J. M. SANDERS.
VEHICLE SPRING.
APPLICATION FILED MAR. 31, 1917.
1,247,578.
Patented Nov. 20, 1917.
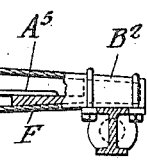
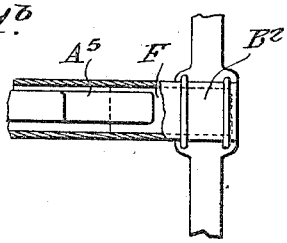
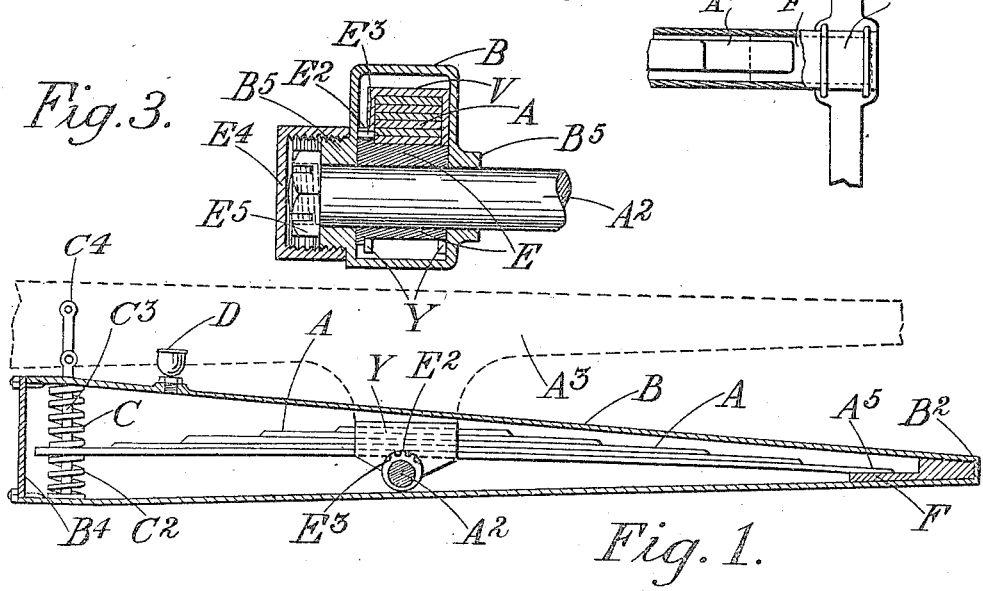
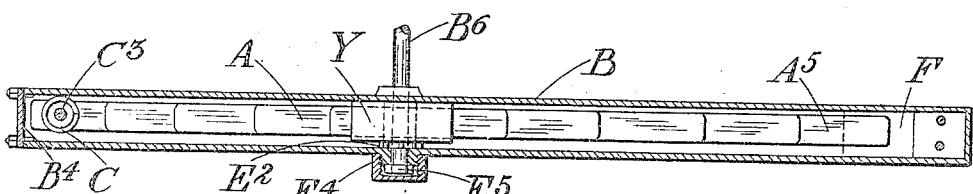
Inventor:
James M. Sanders,
Atty's.

UNITED STATES PATENT OFFICE.

JAMES MAUDSLAY SANDERS, OF KEYNSHAM, NEAR BRISTOL, ENGLAND.

VEHICLE-SPRING.

1,247,578.      Specification of Letters Patent.      Patented Nov. 20, 1917.

Application filed March 31, 1917. Serial No. 158,919.

*To all whom it may concern:*

Be it known that I, JAMES MAUDSLAY SANDERS, a subject of the King of England, residing at Keynsham, near Bristol, in England, have invented certain new and useful Improvements in Vehicle-Springs, of which the following is a specification.

This invention relates to springs for use on road vehicles and comprises a casing working on a pivot provided for the spring between the ends of the spring while the end of the spring remote from the wheel axle lies between a pair of buffer springs one on each side of the spring and carried by a link pivoted to the frame, said casing inclosing the spring and adapted to serve as an oil bath.

In the accompanying drawings—

Figure 1 is a central vertical section showing a construction of this invention;

Figs. 1$^a$ and 1$^b$ showing details;

Fig. 2 is a horizontal section of the same, while

Fig. 3 is a cross-section through the pivot on an enlarged scale.

In the construction shown in Fig. 1, the spring is shown at A, being mounted on a pivot A$^2$ carried by a suitable part of the frame A$^3$. The complete spring is inclosed in a casing B, which is rigid and of any desired cross-section, being, if necessary, circular, the end B$^2$ being attached to the axle in any suitable way or as shown in Fig. 1$^a$ in elevation and Fig. 1$^b$ in plan. The forward end of the spring A lies between a buffer spring C interposed between the spring and the casing and a buffer spring C$^2$ interposed between the spring and the end of a link C$^3$. The link C$^3$ also carries the spring C$^2$ and is slung from the pivot C$^4$ and passes through the top of the casing. The forward end of the casing is inclosed by a plate B$^4$ secured in any suitable manner, and the casing is provided with an oil cup or the equivalent at D so that lubricant can be easily admitted.

The spring casing is pivoted to the frame and the pivot may be located at any suitable point. In the instance illustrated the pivot of the casing is coincident with the pivot or trunnion A$^2$ of the spring, and it may be formed with bosses B$^5$ which take bearings also on the pivot A$^2$ of the spring.

Preferably between the clip Y on the center of the spring and the pivot A$^2$ is interposed an eccentric sleeve E by the rotation of which the spring is raised or lowered slightly so that the height of the frame from the ground may be adjusted. This sleeve may be provided with serrations as shown at E$^2$ locked by pins E$^3$ carried by the spring clip Y, the whole being retained by a nut E$^5$.

Preferably the shape of the casing is as simple as possible with a view to simplicity and cheapness of manufacture, and in cases where the large end of the casing can be made circular the end plate B$^4$ may screw into the casing. In other constructions it may be bolted or attached in any other convenient manner.

The invention can be applied to axles which are not driven, such as the front axles of a motor vehicle.

In assembling, the cover B$^4$ is removed and the spring fitted with its clip and the eccentric sleeve E are inserted through the large end of its casing. The pivot A$^2$ can then be inserted in the eccentric sleeve E and the nut E$^5$ can then be screwed up through the aperture exposed when the cap E$^4$ is removed.

What I claim as my invention and desire to secure by Letters Patent is:—

1. In a vehicle, a spring, a pivot connecting said spring to the vehicle frame, a casing surrounding said spring, a link pivoted to the frame and engaging the spring and the casing at one end and a wheel axle attached to the other end of said casing.

2. In a vehicle, a spring, a pivot intermediate the ends of said spring and connecting said spring to the vehicle frame, a casing surrounding said spring, a link pivoted to the frame and passing through one end of the spring and the casing, springs upon said link and a wheel axle attached to the casing at the end remote from the link.

3. In a vehicle, a spring, an eccentric bushing connected thereto, a pivot passing through said bushing and connecting said bushing to the vehicle frame, an oil-tight casing surrounding said spring, a link pivoted to the frame and engaging the spring and the casing at one end and a wheel axle attached to the other end of said casing.

4. In a vehicle, a spring, an eccentric bushing connected thereto, a pivot passing through said bushing and connecting said bushing to the vehicle frame, an oil-tight casing surrounding said spring, a link pivoted to the frame and passing through one end of the spring and the casing, buffer springs upon said link and a wheel axle attached to the casing at the end remote from the link.

5. In a vehicle, a spring, a pivot connecting said spring to the vehicle frame, a casing surrounding said spring, a link pivoted to the frame and passing through one end of the spring and the casing, a buffer spring upon said pivot between the spring and the casing, a buffer spring upon said pivot between the spring and a fastening on the end of the pivot and a wheel axle attached to the casing at the end remote from the link.

6. In a vehicle, a spring, a pivot connecting said spring to the vehicle frame, a casing having an opening at the end surrounding said spring, an end plate for closing the opening, a link pivoted to the frame and engaging the spring and the casing at one end and a wheel axle attached to the other end of said casing.

In testimony whereof I have signed my name to this specification in the presence of two subscribing witnesses.

JAMES MAUDSLAY SANDERS.

Witnesses:
E. R. PONE.
E. TYLER.

Copies of this patent may be obtained for five cents each, by addressing the "Commissioner of Patents, Washington, D. C."